United States Patent

[11] 3,562,528

[72] Inventor William B. Joyce
 Basking Ridge, N.J.
[21] Appl. No 637,214
[22] Filed May 9, 1967
[45] Patented Feb. 9, 1971
[73] Assignee Industrial Nucleonics Corporation
 a corporation of Ohio

[54] ANGULAR TRACKER RESPONSIVE TO PENETRATING RADIATION
 22 Claims, 22 Drawing Figs.
[52] U.S. Cl. ................................................. 250/83.3,
 250/71.5, 250/83.6, 250/105, 250/106
[51] Int. Cl. ..................................................... G01t 1/16
[50] Field of Search ........................................ 250/83.3,
 71.5, 83.6, 105, 203; 343/113

[56] References Cited
UNITED STATES PATENTS
3,205,361 9/1965 Albus .......................... 250/203
3,291,990 12/1966 Lentz .......................... 250/83.3
3,440,426 4/1969 Bush .......................... 250/237

Primary Examiner—Ralph G. Nilson
Assistant Examiner—Morton J. Frome
Attorneys—Allan M. Lowe, William T. Fryer, III, C. Henry Peterson and James J. O'Reilly ABSTRACT: Disclosed is a system for deriving a direct digital indication of the position of a penetrating radiation source, e.g., a gamma-ray of X-ray source. A detector array having multiple channels with the same field of view is irradiated by the source. Each channel includes a different number of radiation-receiving areas to derive the digital indication. The detector array, in certain embodiments, is shielded with a slit plate or shadow mask. In another embodiment, a single multiple detector channel is shielded with a shadow mask and step changes in illumination of each detector drive a position indicating counter.

PATENTED FEB 9 1971

INVENTOR
WILLIAM B. JOYCE

BY Allan M. Lowe

ATTORNEY

INVENTOR
WILLIAM B. JOYCE

ATTORNEY

ANGULAR TRACKER RESPONSIVE TO PENETRATING RADIATION

The present invention relates generally to systems for locating objects carrying sources of radiation and more particularly to a system for deriving a direct digital indication of the position of a penetrating radiation source.

Systems for tracking the position of objects carrying radiation sources are known and described in the prior art by U.S. Pat Nos. 3,291,987; 3,291,988; 3,291,989 and 3,291,990. Typically penetrating radiation sources emit X-rays and gamma-rays, whereby atmospheric conditions do not affect their propagating characteristics. In the present specification and claims, penetrating radiation is defined as radiation penetrative of clouds and fog and incapable of being focused like light and infrared radiations. These sources may or may not have a random energy distribution.

In the prior art systems, range is computed from the azimuth and elevation angle parameters derived in response to radiation impinging on a tracking detector from a penetrating radiation source carried on a tracked object. Each angle parameter is synthesized by comparing the outputs of a pair of detectors having differing fields of view. Each detector has a single channel output from which is derived a signal amplitude proportional to the level of the energy impinging thereon. If the tracked object lies on a bisector between the detector pair, the signals are of equal amplitude. As the object moves to one side or the other of the bisector the relative signal amplitudes from the detectors are correspondingly varied.

While the prior art systems function admirably in tracking many targets, errors arise in tracking targets moving with a large angular velocity relative to the detector. It can be shown mathematically that tracking an object at a range of 300 feet to within 1 minute of arc in a field of 60° requires a random energy source with a count rate in excess of $10^{12}$ energy particles per second. Presently known random energy, penetrating radiation sources that are capable of atmospheric penetration without excessive attenuation as a function of range are incapable of such count rates.

If the count rate is lower than stated, noise, in the form of background radiation, can mask the signal from a tracked radiation source at the stated angular resolution. For example, to track a target and provide a signal indicative of its angular position once every 0.1 seconds with a resolution of 0.6 minutes of arc, it can be shown that a detector must receive $10^7$ energy counts per second. To determine how many of these energy counts or particles will reach a detector, it is necessary to calculate the angle subtended by the detector in an omnidirectional field of the energy source. If the detector array has an area of approximately 1 square foot and is positioned at a range of 1,000 feet from the source, the detector subtends a solid angle that is $10^{-7}$ of the field irradiated by the source. Hence, before considering the effects of attenuation and detector efficiency, the maximum number of particles impinging on the detector at such a range is only $10^4$, or a factor of $10^{-2}$ below the minimum required to attain the stated resolution.

According to one aspect of the present invention, I have found that resolution to the stated angles and sampling times can be achieved by providing a plurality of detector channels. With respect to some radiation sources, random energy distribution versus time functions can be mathematically expressed in accordance with the Poisson distribution formula:

$$p(k) = e^{-\lambda t} \cdot \frac{(\lambda t)^k}{k!} \qquad (1)$$

where: $t$ is time,
   $k$ is the number of changes in a fixed interval of time $t$, and
   $\lambda$ is the average or expected number of changes in the fixed interval of time $t$.

From equation (1), the amount of information derived increases exponentially as the number of detector channels increases. Hence, if nine channels are provided for receiving energy from the radiation source, the number of counts that must be received by the entire array is reduced to 31 counts per second per channel to achieve the resolution recited supra. In other words, increasing the number of channels from one to nine, reduces the required received count rate by a factor on the order of $10^5$. This allows the use of a small strength source.

In several embodiments of the present invention, a detector assembly for achieving extremely high resolution with very short sampling times comprises a plurality of detectors, each having a different number of detecting areas and an identical field of view for the penetrating radiation source. Each detector channel feeds a binary decision circuit, whereby a multibit binary code indicative of the position of the random energy level versus time source is provided without the intermediary of an analog-to-digital converter. A coded signal is derived since each code combination is uniquely associated with a particular position of energy impinging on the detector.

In one embodiment of the invention, each detector channel includes a plurality of cylindricallike detectors having arcuate shields placed before them. A different number of arcuate shields is placed before each detector to form the different number of detecting areas.

According to a further embodiment of the invention, the detectors are linear and disposed in straight, parallel lines. Shielding each of the elongated detectors is a different number of planar shields to establish the different number of detecting areas for each channel. To provide angular information indicative of the source being tracked, a slit plate is positioned between the source and the detector array. While the planar embodiment of the invention is easier to construct than the embodiment utilizing arcuate shields and cylindrical detectors, the slit plate, in certain instances, does not adequately collimate energy from the source, whereby the possibility of several detector areas in the same channel being illuminated arises.

To avoid ambiguity that might be introduced by failure of the slit plate to collimate adequately, still a further embodiment of the invention incorporates a shadow shield between the source and a plurality of planar detector channels. The shield in such embodiment is positioned so that all of the detector channels are selectively illuminated from one side to a shadow edge defined by the shield.

Several different detector configurations with the shadow shields can be employed. In one embodiment, each detector channel includes a single detector with a plurality of shields, substantially the same as with the embodiment utilizing the slit plate. With the shadow detector, means is provided to detect sudden changes in the energy impinging on the detector, as occurs in response to movement of the radiation source to an area where the detector is illuminated to a lesser or greater extend.

According to still another embodiment of the invention utilizing the shadow shield, the need for means detecting sudden changes in the detector output is obviated by employing, in each detector channel, a plurality of different detectors. In the multiple detector per channel embodiment, each channel is divided into at least two groups of detectors, with a detector of the first group always being adjacent to a detector of the second group. Energy levels impinging on the detectors in the first and second groups are compared to derive an indication of the angular position of the tracked source.

According to still a further aspect of the present invention, a direct digital readout is derived utilizing the shadow technique and a single channel of detectors that are divided into two groups. Energy levels of the radiation impinging on the first and second groups are compared and a counter, or other storage means, is activated in response to each sudden change in the energy level impinging on one of the detectors. Sudden changes in energy level are sensed by comparing the outputs of the first and second groups in each channel. While the single channel detector employing a shadow mask or shield has less resolution than the plural channel systems, it enables a direct resolution than the plural channel systems, it enables a direct digital signal indicative of source location to be derived with much less complexity than the plural channel systems.

It is, accordingly, an object of the present invention to provide a new and improved system for tracking targets carrying sources of penetrating radiation not requiring high-source strengths.

It is an additional object of the present invention to provide a new and improved system for tracking targets carrying penetrating radiation sources with greater resolution and higher sampling rates than prior art systems.

Another object of the present invention is to provide a new and improved system for tracking objects carrying penetrating radiation sources and susceptible to movement at relatively large angular velocities, which system includes a plural channel detector array responsive to radiation from said sources.

A further object of the present invention is to provide a system for deriving a digital signal indicative of the position of a penetrating radiation source without utilizing an analog-to-digital converter.

Still another object of the present invention is to provide a new and improved system adapted to detect the position of a source of penetrating radiation, i.e., radiation penetrative of clouds and fog and incapable of being focused like light and infrared radiations, with greater accuracy and higher sampling rates than previously proposed systems.

The above and still further objects, features and advantages of the present invention will become apparent upon consideration of the following detailed description of several specific embodiments thereof, especially when taken in conjunction with the accompanying drawings, wherein.

Figure 1:
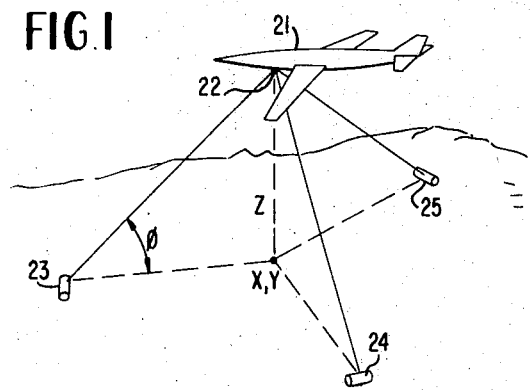
FIG. 1 is a diagrammatic illustration of the environment in which the present invention is designed to be utilized.

Reference is now made to FIG. 1 of the drawings, wherein there is illustrated a tracking system for determining the position of moving aircraft 21, having a source 22 of penetrating radiation. In a typical example, source 22 may emit gamma- or X-ray radiation, or any other known type of penetrative radiation. Source 22 is fixedly mounted on aircraft 21, which is at a relatively low altitude above the ground and is moving at relatively large velocities. For example, the aircraft speed may be on the order of 400 m.p.h. and have an altitude of 500 feet.

Positioned on the ground at predetermined separated points, are detectors 23, 24 and 25, adapted to receive radiation from source 22. Detectors 23—25 derive digital signals indicative of the azimuth and elevation of aircraft 21 relative to each of their positions and feed a computer that tracks the movement of aircraft 21, in a manner similar to that described in the aforementioned prior art patents. In response to the digital signals from detectors 23—25, the computer derives a signal indicative of the aircraft height and ground position. In addition, the computer generates signals to drive detectors 23—25 so that aircraft 21 remains in the field of view of each of the detectors. Alternatively, the detector may be mounted in the moving object to enable computation of the angular position relative to a fixed radiation source.

Since the present invention is concerned only with an angle-measuring detector per se, for measuring one angle parameter, the following discussion is given assuming that the elevation angle Φ of aircraft 21 is measured from detector station 23. It is to be understood, however, that azimuth angles can be measured with substantially the same equipment.

Figure 2:
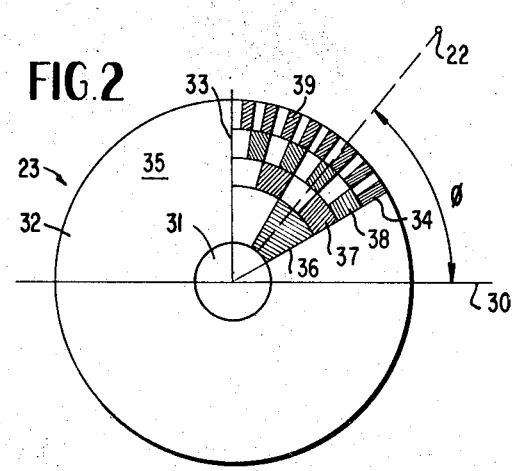
FIG. 2 is a schematic drawing of one embodiment of a detector in accordance with the present invention.
Figure 3:
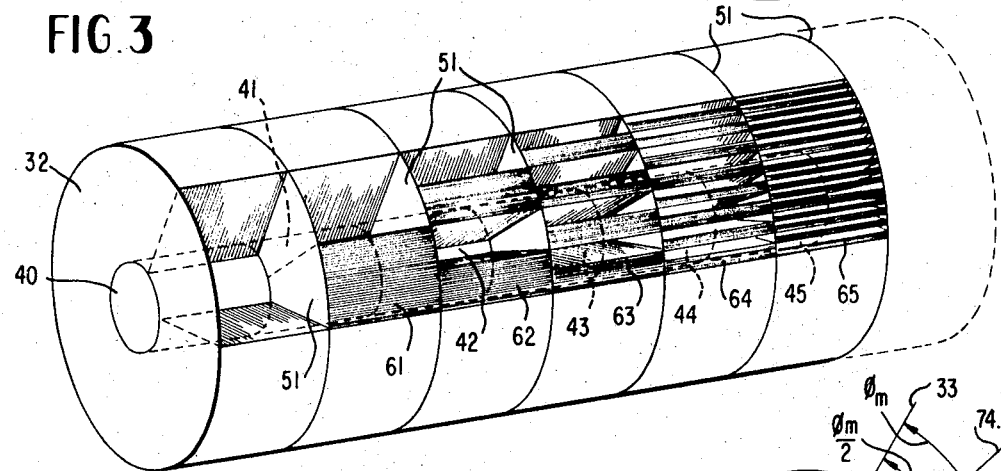
FIG. 3 is a perspective view of the detector array schematically illustrated by FIG. 2.

The principles of one embodiment of the present invention are best comprehended by reference to FIG. 2. In FIG. 2, detector array 23 is illustrated as comprising a circularly-shaped penetrating radiation detector 31, which may comprise a scintillation counter, ionization chamber, Geiger-Mueller tube, semiconductor, or other type of penetrative radiation detector. In either case, detector 31 derives a number of pulses, the number of which is dependent upon the count rate of the radiant energy impinging thereon.

Except for approximately a 60° field of view that is defined by the radially extending edges 33 and 34, detector 31 is surrounded by pie-shaped radiation shielding 32, which may be lead or other material. Shield 32 effectively blocks substantially all environmental, background radiation and prevents such radiation from reaching detector 31.

The arcuate 60° angular surface of detector 31 between radially extending edges 33 and 34 of shield 32 is selectively exposed to radiation from source 22. Those portions of shield 32 exposed to radiation from source 22 are determined by shield array 35, positioned between and extending from edges 33 and 34. For purposes of simplicity and explanation, shield array 35 is illustrated as comprising four different annular sections 36—39, having one, two, four and eight shielded areas, respectively. Shield areas 36—39, shown on the drawing with a hatched cross section, are separated by gaps or regions that enable radiation from source 22 to be propagated to detector 31.

Each of sections 36—39 occupies a different longitudinal position along the axis of detector 31 and has a different detector area thereby associated with it. In effect, detector 31 therefore comprises four separate detectors, one responsive to radiation transmitted through section 36, a second responsive to radiation propagating through shield section 37, etc. Hence, the detector array illustrated by FIG. 2 comprises four channels, each having a different number of effective detector areas. The field of view of each of the four detector channels is identical to the 60° angle between edges 33 and 34 and the arcuate area of each detector channel capable of being irradiated by source 22 is identical, being equal to 30° of arc.

To measure the position of source 22, each detector channel derives a binary signal indicative of the radiation level impinging thereon being above or below a threshold. Hence, in the situation illustrated by FIG. 2, wherein source 22 is at an angle above horizontal line 30, the detector channel associated with shield layer 36 receives a relatively small amount of radiation from source 22 because the shield area is interposed between source 22 and the detector segment associated with shield segment 36. In contrast, the detector channel associated with shield 37 has no shield area interposed between the detector and the source 22 and a considerably larger amount of radiation is detected. Similarly, the portions of detector 31 associated with shields 38 and 39 receive insignificant and considerable radiation from source 22, respectively. Binary detectors connected to the detector channels respond to radiation from source 22 thereby derive binary signals indicative of 0, 1, 0, and 1, respectively. In response to radiation source 22 translating to a different position, wherein a different combination of shields is interposed between detector 31 and the source, a different binary signal is derived.

While only four shield sections are illustrated in FIG. 2, it is understood that in a system having a large resolution, more than four shields are required. For example, in a practical system wherein the output of detector 31 is sampled once every 0.1 seconds and the elevation angle $\Phi$ of aircraft 21 relative to detector station 23 is computed to 0.6 minutes of arc, nine channels are employed to obtain a count rate of 31 per second for a slant range of approximately 300 feet between detector 23 and aircraft 21. The number of detector channels is related to resolution. Poisson's distribution equation, supra, can be used to determine which channel count rate is needed for adequate reliability.

To provide a more complete description and understanding of the detector schematically illustrated in FIG. 2, reference is now made to FIGS. 3—7 of the drawing. The illustrated detector array comprises 10 stacked cylindrical detector segments 40—49, only six of which are illustrated to simplify the drawing. Detector segments 40—49 are isolated from each other electrically and have independent radiation responses to define 10 separate detector channels. Independence in the radiation responses of adjacent ones of detectors 40—49 is established by disc-shaped lead shields 51, one of which is positioned between each of the adjacent detectors and extends to the periphery of shield body 32.

Positioned between each of discs 51 and intercepting energy impinging on detectors 41—49 are cylindrical shield arrays 61—69, respectively. Each of shield arrays 61—69 includes $2^{N-1}$ pie-shaped shield sections, where $N$ is the units digit associated with each shield array, e.g., shield array shield 61 includes $2^{1-1} = 1$ segment, while shield array 64 consists of $2^{4-1} = 8$ segments. Each shield in arrays 61—69 extends to the periphery of sectored cylindrical background radiation shield 32 and has a radius greater than detectors 40—49, in contrast to the schematic showing in FIG. 2. The shields in each of the shield arrays subtend an equal angle and are separated from each other by equal-width pie-shaped gaps. For example, the eight shield segments comprising shield array 64 each subtend an angle $\Phi_m/16$ and the gaps between them cover an equal angle, where $\Phi_m$ is the detector array field of view between edges 33 and 34. No shield section is positioned in front of detector 40, utilized for acquisition purposes, as indicated supra.

Figure 4:
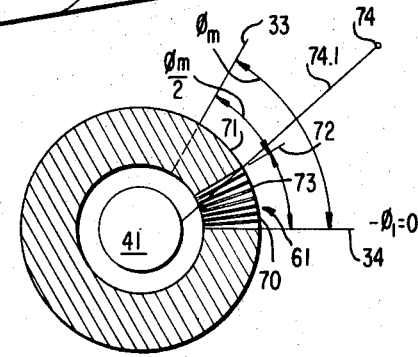
FIG. 4 is a cross-sectional view illustrating a single detection area channel of the FIG. 3 array.

The first channel, associated with shield array 61 and detector section 41, is illustrated in cross section by FIG. 4. Shield array 61 is divided into gap portion 70 and shield portion 71, which together subtend an angle of 60°, between radially extending edges 33 and 34. Shield portion 71 occupies one-half of the area between edges 33 and 34, spanning the 30° of arc from edge 33 to centerline 72 between edges 33 and 34. Hence, shield 71 blocks radiation from source 22 when the source is within the detector array field of view above centerline 72, preventing radiation from reaching detectors 41 and a low level output is derived from the arcuate surface of detector 41. In contrast, the gap portion 70 between centerline 72 and edge 34 is transparent to penetrating radiation so that the presence of a radiation source in the arc between line 72 and edge 34 irradiates detector 41 with relatively large amounts of radiation.

Figure 5:
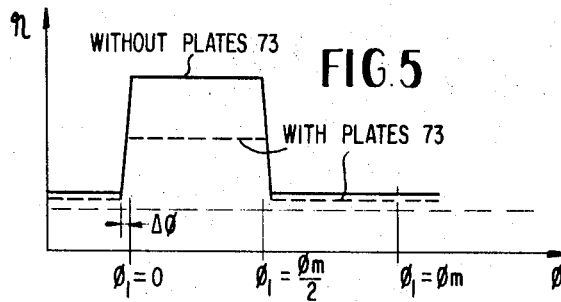
FIG. 5 is a plot of amplitude versus position for the detector channel illustrated by FIG. 4.

The relationship between the angular position and the radiation count rate impinging on detector 41 is illustrated by FIG. 5, wherein count rate is plotted as the ordinate and angle as the abscissa of a Cartesian coordinate system. In FIG. 5, the angular positions corresponding with edges 33 and 34 are indicated as $\Phi_1 = \Phi_m$ and $\Phi_1 = 0$, respectively, while the angular position corresponding with centerline 72 is indicated as $$\varphi_1 = \frac{\varphi m}{2}$$

It is noted from FIG. 5 that count rate as a function of angle has very sharp slopes, of virtually 90°, at the angles $\Phi_1 = 0$ and $$\varphi_1 = \frac{m}{2}$$

and that between these two angles the count rate remains constant. For angular positions less than $\Phi_1 = 0$ and greater than $$\varphi_1 = \frac{m}{2}$$

the count rate does not drop to zero, however, because of the ever-present background radiation to which any scintillation or semiconductor detector is exposed, as well as the inability of any shield to attenuate sufficiently radiation from a source and prevent all of the radiation from reaching detector 41. The count rate due to background and imperfect shielding from the source is generally on the order of four counts per second, a factor that is sufficiently small relative to a count of 31 counts per second to be generally ignored.

Figure 7:
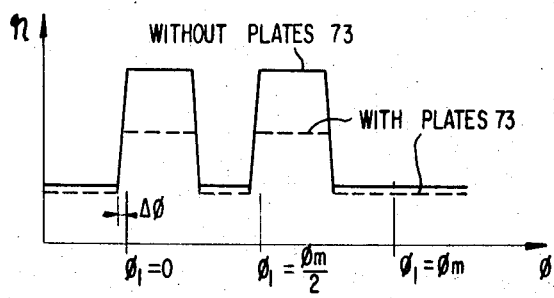
FIG. 7 is a plot of amplitude versus position for the detector channel illustrated by FIG. 6.

Thin, radially extending collimator plates 73 are placed in gap 70 between centerline 72 and edge 34 in the shield structure 71 of FIG. 4 to reduce the penumbral shadow region, $\Delta\Phi$ shown in FIG. 7. Reduction in $\Delta\Phi$ is had with a sacrifice in count rate. Collimator plates 73 are preferably made of a dense, but rigid, metal, such as tungsten to absorb off-axis radiation from source 22 that might otherwise impinge on the exposed portion of detector 41. Hence, if a radiation source were positioned at point 74, FIG. 4, the shortest distance between point 74 and detector 41 is through shield 71. However, there is a straight line path from point 74 to detector 41 for energy following the path defined by line 74.1. Collimator plates 73 intercept and absorb the energy following line 74.1, whereby the relatively vertical response indicated by FIG. 5 is derived. Collimator plates 73 have no effect on radiation directed radially toward detector 41, however, since they have no substantial cross section blocking the radiation path in such an instance.

Figure 6:
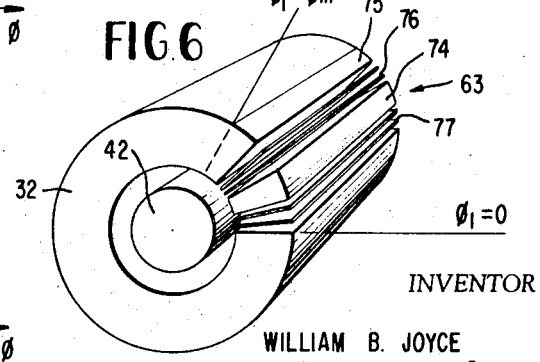
FIG. 6 is a perspective view of a two detector area channel of the FIG. 3 array.

A perspective view of detector 42 and shield section 62, having two shield segments 74 and 75, is illustrated in FIG. 6. Each of shield segments 74 and 75 defines an angular sector of approximately 15° and is separated from the other by gap 76 of 15°, while gap 77 separates shields 74 and 32. Gaps 76 and 77 define two exposed areas on detector 42, in contrast with the single area defined on detector 41 by gap 70. Thereby, shields 74 and 75, with gaps 76 and 77, divide the arc of detector 42 in the field of view of the second channel into four areas, two of which can be exposed directly to radiation from a source and two of which cannot be directly irradiated by the source.

A plot of count rate derived from detector 42 as a function of angle across the field of view of the second channel is indicated by FIG. 7. From FIG. 7, it is seen that for sources in the angular regions $$0 \leq \varphi_1 \leq \frac{\varphi_m}{4} \text{ and } \frac{\varphi_m}{2} \leq \varphi_1 \leq \frac{3\varphi_m}{4}$$

relatively large counts are derived, while low count rates are generated when the source is outside of these boundaries.

Relatively steep slopes between the transition points on the plot of FIG. 7 are established by providing collimating plates 73 in gaps 76 and 77 of the detector channel illustrated by FIG. 6, in a manner similar to what is achieved with the detector channel illustrated by FIG. 4. The number of collimator plates in each gap of the FIG. 4 configuration is less than the number of such plates provided in the single, relatively large gap of FIG. 4 because of the fewer off-axis radiation paths.

It is to be understood from the description of FIGS. 4—7 that the remaining seven detector channels include progressively larger number of shields and gaps, with the number of gaps associated with each channel being commensurate with the number of the detector, i.e., detector 43 receives radiation through four different gaps, detector 44 is responsive to radiation directed through eight gaps, etc. The number of plates per degree may be the same for every channel. As the number of gaps increases, the opening in each decreases, whereby the number of collimator plates is reduced.

Figure 8:
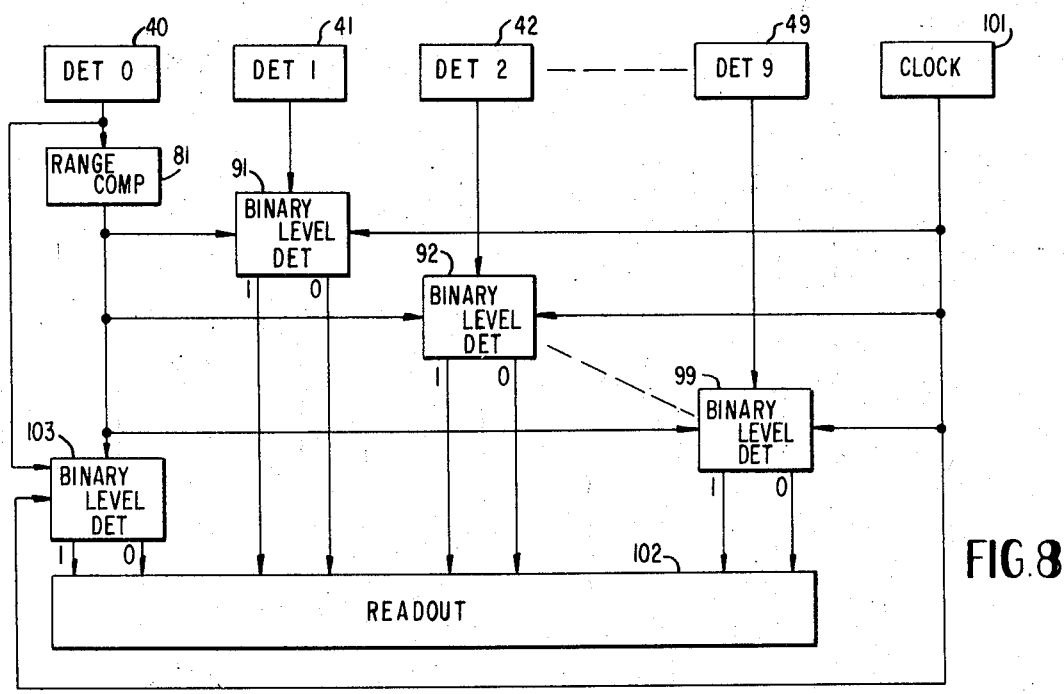
FIG. 8 is a block diagram of the apparatus utilized for reading information from the array of FIG. 3.

Reference is now made to FIG. 8 of the drawings, wherein a circuit diagram of the apparatus utilized to derive an indication of the angular position of radiation source 22, in conjunction with detectors 40—49 is illustrated. The circuit of FIG. 8 includes means for automatically setting the level of binary decision elements responsive to the output of each detector as a function of range between detector station 23 and aircraft 21. To this end, the output of detector 40 feeds a range computer 81. Range computer 81 provides a signal proportional to the slant distance between detector station 23 and aircraft 21.

The output of range computer 81 is applied to nine different binary level detectors 91—99, respectively responsive to the count rates derived from detectors 41—49. To simplify the drawing, only detectors 41, 42 and 49 for the channels having one, two and 256 shield gaps is shown. Similarly, only binary level detectors 91, 92 and 99, respectively responsive to the outputs of detectors 41, 42 and 49 are specifically illustrated on FIG. 8.

Each of binary level detectors 91, 92, etc., includes a pair of output leads for deriving binary zero or one signals, depending upon the amplitude of the signal applied to the detector by its respective radiation detector. Each of level detectors 91—99 counts or integrates the signal from its corresponding radiation detector over a predetermined sampling time interval, equal to the interval between adjacent 50 millisecond pulses of 10Hz clock source 101. The output of clock source 101 is applied in parallel to each of the detectors 91—99. If the number of counts impinging on a radiation detector 41—49 is greater than an amplitude set in level detectors 91—99 during the interval between adjacent pulses from clock source 101, the binary level detector derives a binary one output in response to a pulse from clock source 101. In contrast, a binary zero output is derived from the level detectors 91—99 if the count number is less than the detection level thereof.

The binary ones and zeros generated by level detectors 91—99 are applied to readout means 102. Readout means 102 may take the form of a visual indicator, in which case it includes circuitry for converting the binary coded signals from detectors 91—99 into a decimal signal for human presentation. In the alternative, readout means 102 may comprise the input to a digital computer that responds to data from the other detectors of FIG. 1. The computer digitally calculates the elevation and ground position of aircraft 21 in response to its several digital input signals.

To eliminate ambiguities which can occur if radiation from a source is blocked from detectors 41—49 while the source is in the field bounded by the angles $\Phi_1 = 0$ and $\Phi_1 = \Phi_m$, as occurs in one position out of $2^8$, the output of detector 40 is fed through binary level detector 103. Detector 103, indentical with each of detectors 91—99, derives a binary signal that is combined with the outputs of detectors 91—99 in readout circuit 102. If a radiation source is at an angle between $0 \leq \Phi \leq \Phi_m$, there is a 1:256 probability of radiation impinging only on detector 40, which readout circuit 102 provides.

Figure 9:
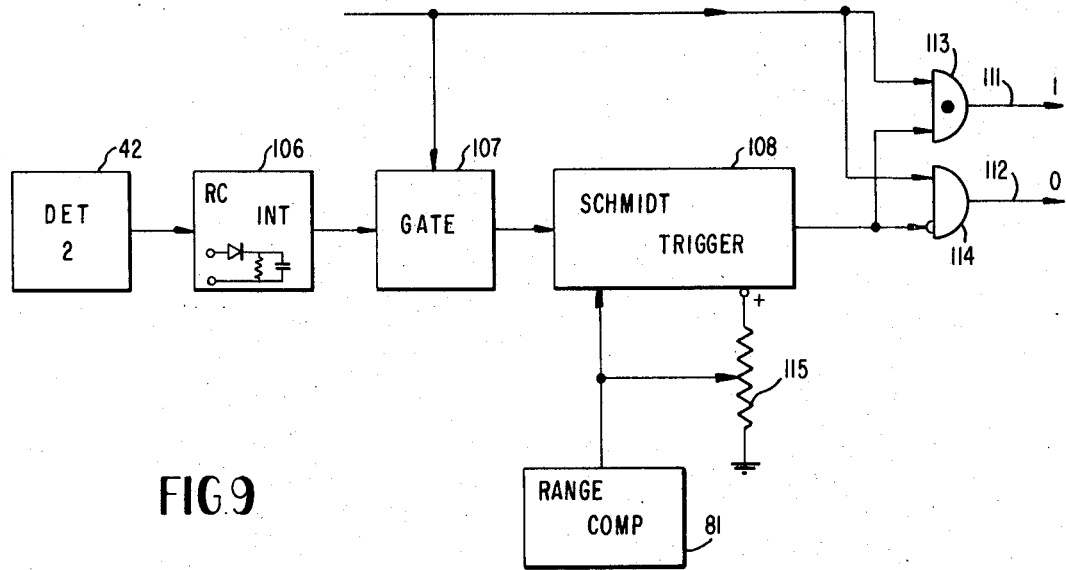
FIG. 9 is a circuit diagram of one binary level detector, employed in the circuit of FIG. 8.

Reference is now made to FIG. 9 of the drawings wherein there is illustrated a preferred embodiment for the circuitry utilized in each of the binary level detectors 91—99 and 103. For purposes of explicitness, it is assumed that the detector illustrated by FIG. 9 is detector 91, which is responsive to the count output of detector 41. Detector 41 is coupled to the input of RC integrator 106, having a very short charging time constant, on the order of 1 microsecond, but a relatively long discharge time constant equal to the interval between adjacent pulses from clock source 101. Such RC integrators are well known in the art, and generally comprise diodes feeding parallel resistance capacitance networks, hence need not be described in detail.

The output of RC integrator 106 is sampled once every 0.1 seconds for a 50-millisecond interval in response to the output of clock 101. Sampling is accomplished with normally closed gate 107 that is opened to enable the voltage level at the output of integrator 106 to be passed to the input of Schmidt trigger 108 only for the duration of the 50-millisecond clock pulses derived from source 101 once every tenth of a second.

The triggering level of Schmidt trigger 108 for the output of gate 107 is variable, in response to the voltage level generated by range computer 81. As the output signal derived from range computer 81 increases to indicate greater ranges between aircraft 21 and detector array 23, the threshold level of Schmidt trigger 108 decreases. Schmidt trigger 108 responds to the variable amplitude pluses applied to it by gate 107 to derive constant amplitude, constant width pulses of approximately 75 milliseconds duration if the signal applied to it is above the threshold value established by range computer 81. If the voltage applied to Schmidt trigger 108 by RC integrator 106 is less than the threshold value established by range computer 81 during the 50-millisecond interval when gate 107 is opened, the trigger output voltage remains at a constant, zero level.

The output of Schmidt trigger 108 is sampled once each time that gate 107 is opened to derive binary one and zero positive voltage indicating signals on leads 111 and 112, respectively. Sampling is accomplished by feeding the Schmidt trigger output in parallel to one input of AND gate 113 and the inhibit input of inhibit gate 114. Each of gates 113 and 114 is strobed with a pulse from clock source 101 once every 0.1 seconds for a 50-millisecond interval, whereby there are derived positive and zero voltages on lead 111 if Schmidt trigger 108 is activated in response to the output of RC integrator 106. In an opposite manner, zero and positive voltages are derived on leads 111 and 112 in response to the input of Schmidt trigger 108 being less than the threshold value established therein.

As an auxiliary or alternative feature, the threshold level of Schmidt trigger 108 can be manually adjusted by the voltage tapped from the slider of potentiometer 115, energized with a positive DC potential. The voltage at the slider of potentiometer 115 is linearly combined with the DC output voltage of range computer 81 to establish the threshold level of Schmidt trigger 108.

The voltage tapped from potentiometer 115 can be set manually or automatically as a function of height when the equipment is utilized for measuring azimuth angle. Generally, it is necessary to vary the threshold level of Schmidt trigger 108 as a function of elevation angle because, at higher elevation angles, smaller amounts of radiation pass through the gaps in shield sections 61—69. Smaller amounts of radiation pass through shield sections 61—69 at higher elevations because the collimators and shields have a tendency to shadow detector 31 from source 22. Hence, for elevations approaching 90° while measuring azimuth, the threshold level of Schmidt trigger 108 is lowered, whereby a binary one signal is derived on lead 111 in response to a lower count rate received by detector 42.

It is to be understood that the threshold value of Schmidt trigger 108 can be controlled exclusively by manual means and that the position of the slider of potentiometer 115 can be adjusted by hand as a function of range between detector array 23 and aircraft 21. In such a case, the slider of potentiometer 115 is adjusted so that the threshold of Schmidt trigger 108 is lowered for increasing ranges.

Figure 10:
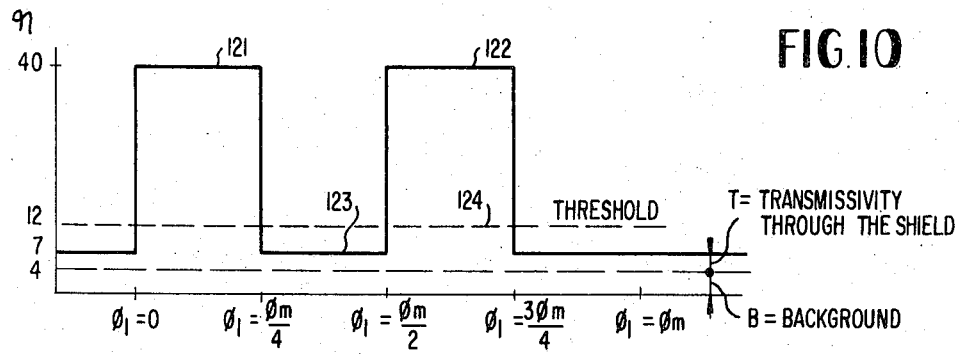
FIGS. 10 and 11 are plots of the amplitude versus angular position output of the detector channel including two detector areas, for sources at short and long ranges, respectively.
Figure 11:
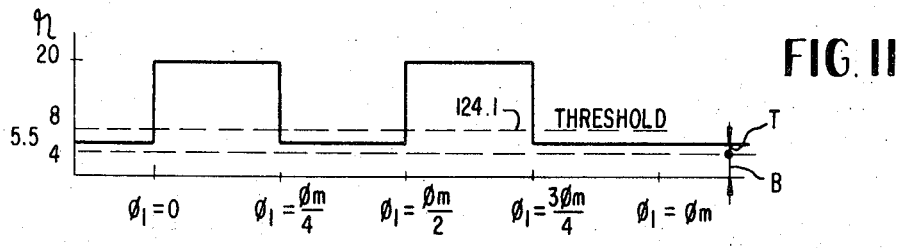

To provide an understanding of the manner in which the circuit of FIG. 9 functions in conjunction with detector 42, having a pair of radiation transparent gaps therein, reference is made to FIGS. 10 and 11. FIGS. 10 and 11 respectively are plots of radiation level as a function of angle for short and long ranges between aircraft 21 and detector array 23. In addition, FIGS. 10 and 11 indicate how: threshold value changes as a function of range; stray radiation from source 22 propagating through the shield structure to detector 42 varies as a function of distance; and background radiation remains constant.

In FIG. 10, pulses 121 and 122, having a relatively large amplitude compared to base line 123, are derived for the angular spans $$0 \leq \varphi_1 \leq \frac{\varphi_m}{4} \text{ and } \frac{\varphi_m}{2} \leq \varphi_1 \leq \frac{3\varphi_m}{4}.$$

It is assumed that aircraft 21 carrying source 20 is close to the detector, whereby the average count impinging on detector 42 for the angle defined by levels 121 and 122 is 40 per second. In response to the relatively high count rate detected with aircraft 21 so close to detector array 23, range computer 81 derives a relatively small voltage that sets the threshold of trigger 108 to a relatively large value of 12 counts per second, as defined by line 124. The background count rate is assumed to be 4 per second while 3 counts per second are assumed to propagate through the shield structure to detector 42 with the relatively small separation between aircraft 21 and detector 23.

FIG. 11 indicates the manner in which threshold line 124' decreases to 8 counts per second when aircraft 21 becomes removed sufficiently from detector 23 to cause the detector 42 count rate to drop to 20 per second in the angular region defined by the gaps $$0 \leq \varphi_1 \leq \frac{\varphi_m}{4} \text{ and } \frac{\varphi_m}{2} \leq \varphi_1 \leq \frac{3\varphi_m}{4}.$$

Similarly, the transmitivity through the shield structure to detector 42 drops from 7 to approximately 5½ counts per second with increased range, while background radiation level remains constant at 4 counts per second. Because the threshold level 124 has dropped in FIG. 11, the probability of deriving a binary one output from AND gate 113 remains approximately the same as under the conditions existing with the waveform of FIG. 10. A decrease in probability does not occur even if the count rate should drop for a relatively short time interval because of the variable threshold. The lower threshold, however, can cause a greater probability of binary ones on output lead 111 of the network of FIG. 9 if background radiation should increase. It is generally understood, however, that background radiation is a long term phenomena, is not subject to appreciable variations and can be predicted on an a priori basis. Hence, the level of detector 108 can be preset to indicate background with great reliability.

Figure 12:
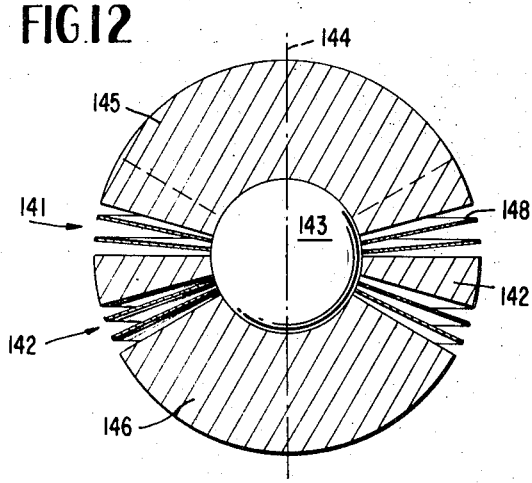
FIG. 12 is a perspective view of another embodiment of a single detector channel of the present invention.
Figure 14:
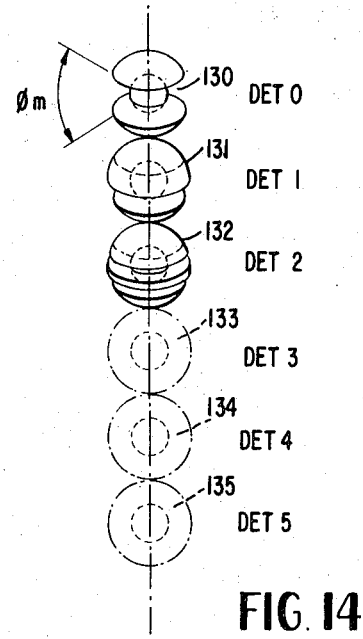
FIG. 14 is a perspective view of a plurality of channels, such as illustrated by FIG. 12, in stacked relationship.
Figure 13:
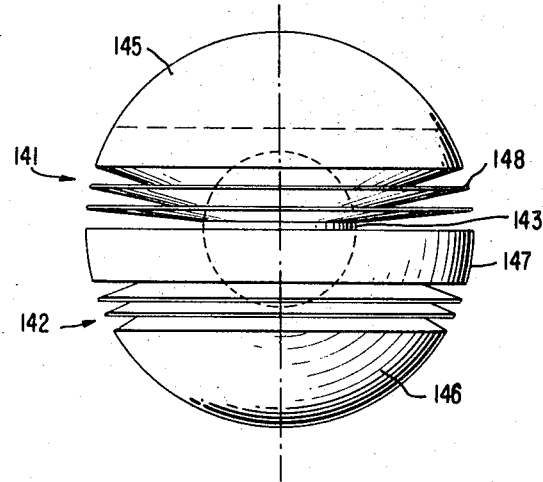
FIG. 13 is a cross-sectional view of the detector channel of FIG. 12, taken through the lines 13–13.

Reference is now made to FIGS. 12—14 wherein there is illustrated still a further embodiment of the present invention. The embodiment of FIGS. 12—14 is particularly adapted for measuring elevation angle independently of azimuth, that is, elevation angle is measured with the same response regardless of the azimuth angle of aircraft 21.

In the embodiment of FIGS. 12—14, 10 separate detector channels 130—139 are provided in stacked vertical relationship. As in the embodiment discussed supra, each of the detector channels 130—139 has an identical field of view from an angle $\Phi_1 = 0$ to $\Phi_1 = \Phi_m$ and includes a different number of gaps for enabling penetrating radiation to be transmitted to a scintillation or semiconductor detector.

A typical detector in the array of FIG. 14 is disclosed in perspective and cross-sectional views by FIGS. 12 and 13, respectively. The detector illustrated by FIGS. 12 and 13 includes a pair of gaps 141 and 142 for enabling radiation to reach detector 143. The shield structure is defined by rotating the cross section illustrated by FIG. 13 about the vertical axis 144 that extends through the center of detector 143. Thereby, a figure of revolution comprising two main annular shield sections 145 and 146 and a disclike shield section 147 is provided. Gaps 141 and 142 are formed between the two main shield sections 145 and 146 and the disclike section 147. Disposed in the gaps are collimator plates 148 which are constructed and function similarly to collimator plates 73, FIG. 4. Because the detector shield of FIG. 13 has a 360° field of view relative to the azimuth angle, radiation impinges equally on all segments of detector 143 regardless of the azimuth position of aircraft 21 relative to detector array 23.

It is to be understood that the remaining detectors in the stacked array illustrated by FIG. 14 are constructed similarly to the shield for the second channel illustrated by FIGS. 12 and 13. Of course, each of the other channels includes a shield having a different number of gaps for enabling radiation to reach the detector located therein from the two gap arrangement illustrated by FIGS. 12 and 13.

Figure 15:
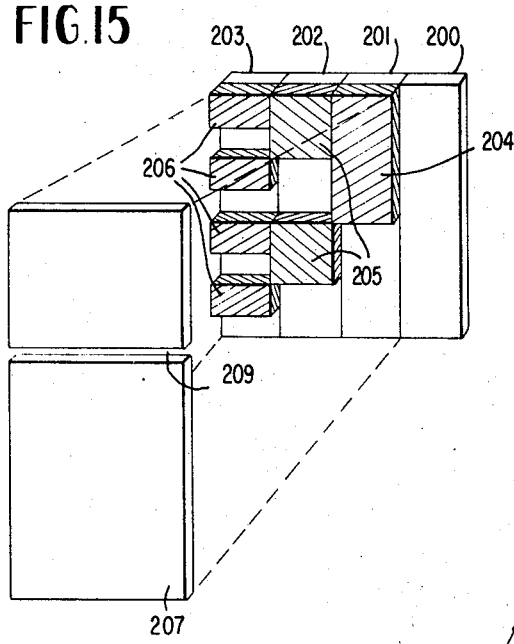
FIG. 15 is a perspective view of a further embodiment of the present invention wherein a planar detector array is employed in combination with a shield having a slit.
Figure 16:
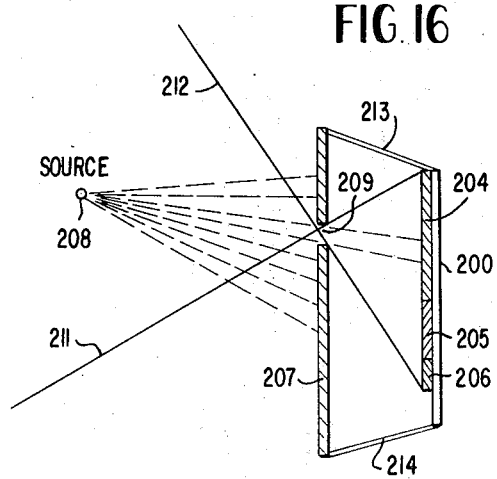
FIG. 16 is a side view of the embodiment illustrated by FIG. 15.

Reference is now made to FIGS. 15 and 16 of the drawings wherein there is illustrated another embodiment of the present invention wherein planar, rather than circular, shields and detectors are employed. In the embodiment of FIGS. 15 and 16, as well as the remaining plural channel embodiments to be described, only three separate position-indicating channels are specifically illustrated, for the purposes of simplicity. It is to be understood that the number of channels should be increased, e.g., to nine, and that the resolution of the system increases as an exponential function of the number of channels.

The detector of FIGS. 15 and 16 comprises four elongated, planar detector arrays 200—203 responsive to energy from a random source, such as gamma-rays or X-rays. Each of detector arrays 200—203 has the same length and width, and mutually parallel longitudinal axes, so that they are in side-by-side adjacent relationship. Positioned to intercept penetrating radiation that would otherwise impinge on detectors 201—203 are shielding arrays 204—206, respectively.

Each of the shields in shield arrays 204—206 is located across the entire width of its corresponding detector and is located on the normally exposed detector surface. Shielding array 204 includes a single shield that extends from the center of detector 201 to its upper surface. Shielding array 205 includes a pair of shields, each having a length equal to one-fourth of the length of detector 202 and positioned so that equal ¼-length segments of the detector 202 can be illuminated by radiation. Detector array 206 includes four spaced shields, each having a length one-eighth of the length of detector 203 to define four gaps along the detector responsive to penetrating radiation.

Positioned between the detector arrays and source 208 of penetrating radiation carried on a vehicle, the angular position of which is being monitored, is slit plate 207. Slit plate 207, mounted in a plane parallel to the detector array, is a shield to penetrating radiation from source 208 and includes a centrally located elongated slit 209, extending substantially across its width.

The vertical position of horizontally extending slit 209 is determined by the use to which the angular detector of FIGS. 15 and 16 is made. For measuring an object that is always located vertically above the detector array, such as a ground-based aircraft angular position detector, the longitudinal axis of slit 209 is positioned substantially above the centerline through detectors 201—203, as defined by the lower edge of shield 204. If the angular detector, however, is employed in a system wherein the radiation source is in the same horizontal and vertical plane as the detector array, slit 209 lies on the intersection between the lower surface of shield 204 and the exposed portion of detector 201.

In any event, the field of view to which the detector array of FIGS. 15 and 16 responds is defined by the lines 211 and 212, extending through slit 209 from the upper and lower edges of the detector array, respectively. To enlarge the angular field of view, slit plate 207 is moved closer to the detector array and the detector array is enlarged along the longitudinal axes of each of detectors 200—203. Enlarging the detector array by translating shield 207 to closer proximity with the detector array, however, has the disadvantage of reducing the resolution of the system. Reduction in resolution occurs because off-axis radiation from source 208 is not collimated by slit 209 when shield 207 is in close proximity to the array. Because radiation from source 208 is not collimated when it impinges on the detector array for a relatively close spacing between the array and shield 207, a relatively wide radiation beam impinges on the channels associated with detectors 200—203, along the detector longitudinal axes. Of course, if a relatively wide beam impinges on the detector array, the possibility of ambiguous readout occurs because the beam may impinge on two exposed detector portions in a single channel, particularly in the highest resolution channels wherein spacing between exposed detector areas is quite small.

In the configuration of FIGS. 15 and 16, detector 200, having no shield interposed between it and shield 207, is utilized for obtaining information indicative of the presence or absence of a radiation source, in the same manner as detector 40 is utilized in the previously described embodiments. To prevent radiation from source 208 impinging on the detector array when the source is out of the field of view defined by lines 211 and 212, shield plates 213 and 214 extend from the upper and lower edges of shield 207 to the upper and lower edges, respectively, of the detector array. Similar shields, not shown, extend from the left and right edges of slit plate 207 to the left and right edges of the detector array.

The outputs of detectors 200—203 are applied to a circuit identical to that illustrated in FIG. 8 to derive a digital indication of the position of radiation source 208.

Figure 18:
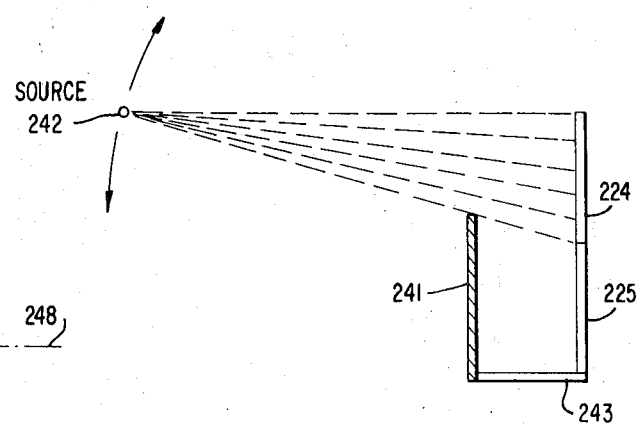
FIG. 18 is a side view of the embodiment illustrated by FIG. 17.
Figure 17:
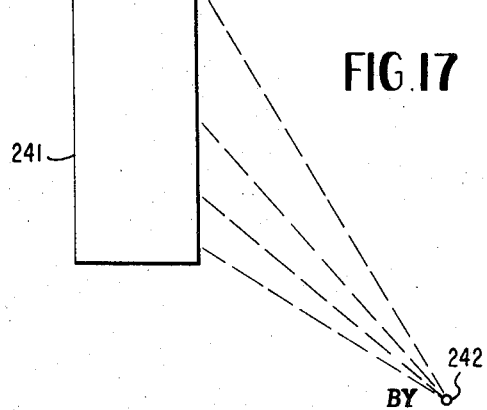
FIG. 17 is a perspective view of still another embodiment of the present invention wherein a planar detector array and a shadow mask or shield are employed.

Reference is now made to FIGS. 17 and 18 of the drawings, wherein there is illustrated another embodiment of the invention employing a planar detector array. In the detector of FIGS. 17 and 18, only three detector channels 221, 222 and 223 are provided. Each of channels 221—223 includes two groups of detectors, with channel 221 including two adjacent detectors 224, 225 having common longitudinal axes. In the first group of detector channel 222 are included two detectors 226 and 227, separated by the second detector group, comprising detectors 228 and 229. In detector channel 223, the first detector group includes detectors 231—234 separated from each other by the detectors of second group, including detectors 235—238. The detectors in each of groups 221—223 are longitudinally aligned, with the detectors of the first group always being separated by the detectors of the second group, and an equal number of detectors in each group being provided in each channel. The several channels are in abutting relationship, in a manner similar to the embodiment of FIG. 15.

The detector array of FIG. 17 has the advantage over the system of FIG. 15 of increased accuracy because reliance is not made upon the absence of a signal on one of the detectors for information. Instead, each of channels 221—223 includes detector groups that cover the entire length of the channel. In addition, since a definite indication of energy impinging on each channel is derived, there is no need for a detector channel, such as channel 200, in the system of FIGS. 15 and 16.

The system of FIGS. 17 and 18 differs in a more important manner from the configuration of FIGS. 15 and 16, however, by virtue of shadow mask or shield 241 that is positioned between the detector array and penetrating radiation source 242. Shield 241 is positioned in a plane parallel to the detector array to intercept a portion of the energy from source 242. Shield 241 prevents substantially all of the radiation-responsive array below a predetermined line, determined by the position of source 242, from being irradiated. The remainder of the radiation-responsive array, above the horizontally extending shadow line defined by the upper edge of shield 241 is illuminated by source 242. By measuring the demarcation line between the illuminated and nonilluminated portions of the detector array, the angular position of source 242 is determined.

The shadow edge system of FIGS. 17 and 18 has the advantage over the slit plate array of FIGS. 15 and 16 in that the former system does not rely upon collimating the radiation source as it impinges upon the detector array. With the detector of FIGS. 17 and 18, energy from source 242 need not impinge on the detector array in parallel lines to define a relatively narrow irradiated strip across the width of the detector array. Instead, a relatively large area of the detector array is illuminated.

To prevent possible spurious results from being derived with the system of FIGS. 17 and 18, shield 243 extends from the lower edge of the array horizontally to shield 241, whereby radiation from source 242 cannot be coupled to the detector array if the source is at an angle below the upper edge of shield 241.

Figure 19:
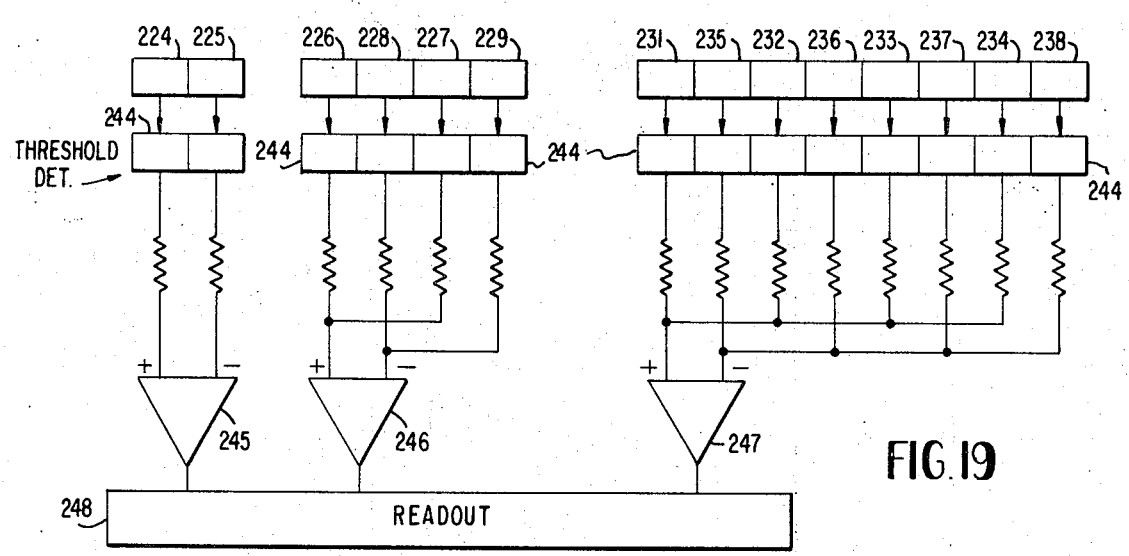
FIG. 19 is a circuit diagram of the readout apparatus employed with the embodiment of FIG. 18.

One preferred embodiment for detecting the demarcation line between the irradiated and nonirradiated detector portions of the system of FIGS. 17 and 18 is illustrated by the circuit diagram of FIG. 19. In the circuit of FIG. 19, the detectors in channels 221—223 are arranged so that the detectors of each channel are similarly grouped. The output of each of the separate detectors is fed to a separate threshold detector 244, of the type illustrated by FIG. 9, except that no range computer is employed. Thereby, each of threshold detectors 244 derives a bilevel voltage output indicating whether any radiation from source 242 impinges on the radiation detector which feeds radiation counts to it.

The outputs of detectors 244 are fed to three differential DC amplifiers 245—247. The voltages derived from amplifiers 245—247 indicate whether an even or odd number of radiation detectors in each of groups 221—223 is illuminated in response to energy from source 242. Each of the threshold detectors feeding input signals to amplifiers 245—247 is connected with an output resistance, each of which is equal in value so that equal amplitude voltages are applied by each detector to the amplifier input terminals.

To achieve the amplifier bilevel output signals, threshold detectors 244, driven by radiation detectors 224 and 225, in channel 221, feed the plus and minus input terminals, respectively, of differential amplifier 245. Threshold detectors 244, responsive to the radiation detectors 226 and 227 in the first group of detectors in count 222, feed the plus input terminal of differential amplifier 246 while the minus input terminal of differential amplifier 246 is responsive to the sum of the bilevel voltages derived from the remaining threshold detectors in the second group. Similarly, the plus input terminal of differential amplifier 247 is responsive to the threshold detector outputs that are fed by detectors 231—234 of the first group of detectors in the third channel 223 while the minus input terminal of differential amplifier 247 is responsive to the bilevel signals derived in response to detectors 235—238 in the second group of detectors 223. In response to the positive and negative voltages applied to their inputs, amplifiers 245—247 derive bilevel output voltages, having values of either zero or a fixed positive amplitude.

To provide an understanding as to the functioning of FIGS. 17—19, it is assumed that the demarcation line between the irradiated and nonirradiated portions of the detector array of FIG. 17 is defined by line 248, passing through detectors 224, 228 and 232. In response to such irradiation, each of detectors 224, 226, 228, 231, 232 and 235 derives a signal having a sufficient count rate to cause the threshold detectors fed thereby to generate a positive bilevel output. The remaining detectors in the array, viz., detectors 225, 227, 229, 233, 234, 236, 237 and 238, are insufficiently irradiated to cause the threshold detectors driven thereby to derive binary one signals. In consequence, zero voltage signals are generated by each of these threshold detectors.

In response to the high and low count rates derived from detectors 224 and 225, positive and zero voltage amplitudes are applied to the positive and negative input terminals of differential amplifier 245, whereby the amplifier is driven to generate a positive constant level output voltage. Amplifier 246, however, responds to its inputs to derive a zero voltage output because equal positive voltages are applied to its positive and negative input terminals by the threshold detectors driven by radiation detectors 226 and 228. The threshold detectors driven by radiation detectors 227 and 229 generate zero output voltages that have no effect on the input voltages applied to amplifier 246.

Radiation detectors 231 and 232 derive outputs whereby a pair of positive voltages are applied to the positive input terminal of differential amplifier 247 while a single positive voltage is applied to the negative terminal of amplifier 247 in response to the signal derived by radiation detector 235. Since the positive input terminal of amplifier 247 has a greater voltage applied thereto than the negative input terminal of the amplifier, the amplifier output is a positive voltage.

The bilevel outputs of amplifiers 245—247 are applied to readout circuit 248, which converts the parallel binary signal to a human readable decimal indication.

Figure 20:
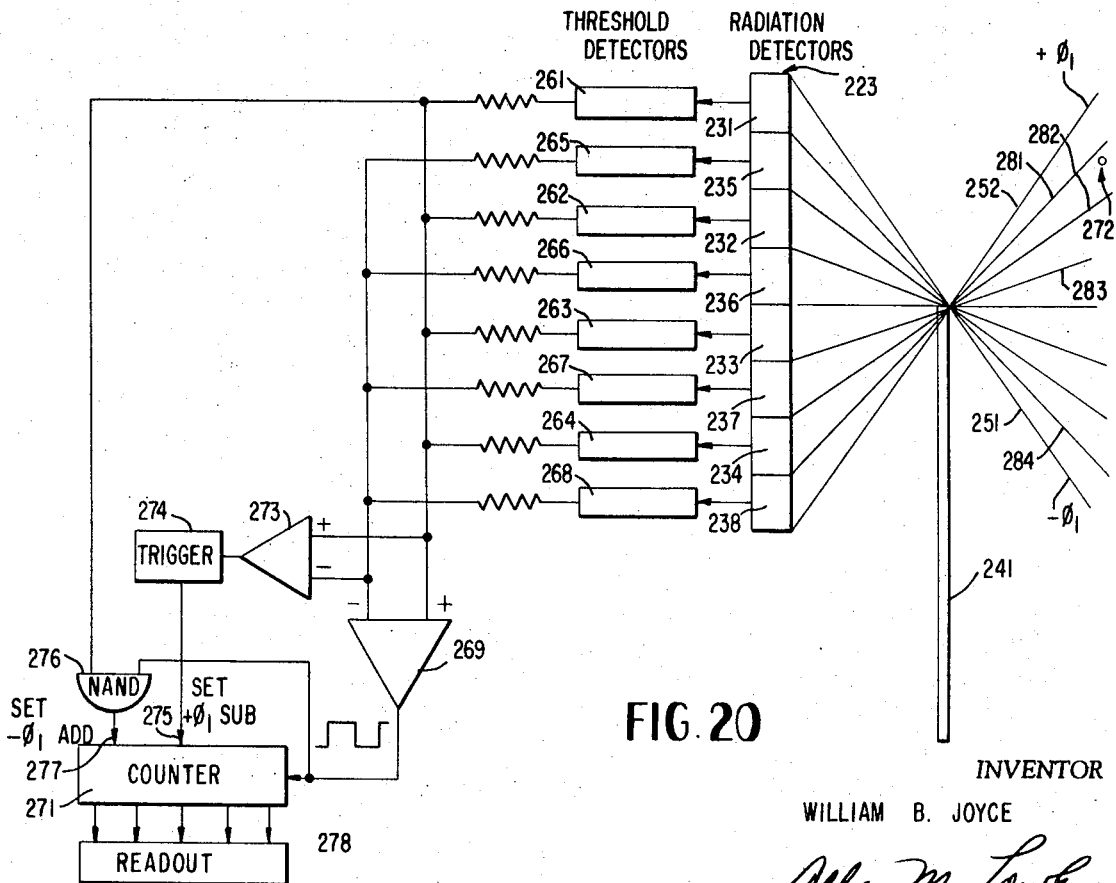
FIG. 20 is a circuit diagram of the readout apparatus utilized with a shadow mask and a single planar detecting channel, of the type illustrated by FIG. 17.

Reference is now made to FIG. 20 of the drawings, wherein there is illustrated a further embodiment of the present invention. In FIG. 20, shadow mask or shield 241 is utilized in conjunction with a single detector channel having a relatively high resolution, for example, detector channel 223 of FIG. 17. The field of view covered by detector channel 223, including detectors 231—238, is between the lines 251 and 252 and covers an angle from $-\Phi_1$ to $+\Phi_1$ relative to the horizontal. The output of each of detectors 231—238 is applied to the input of threshold detectors 261—268, respectively, each of which derives a bilevel input as described supra in conjunction with FIGS. 9 and 19.

The bilevel outputs derived by threshold detectors 261—264 are applied in parallel through summing resistors to the positive input terminal of differential amplifier 269 while the outputs of threshold detectors 265—268, for the second group of detectors in channel 223, are applied to the negative input terminal of differential amplifier 269. Differential amplifier 269 responds to the difference of the voltages applied to its input terminals to derive a bilevel output voltage, in a manner similar to amplifier 247, FIG. 19.

The output voltage of amplifier 269 is coupled to the count advance input of counter 271, which serves as a memory to indicate the position of radiation source 272. Counter 271 is advanced in response to each transition in the output voltage of amplifier 269.

Counter 271 is selectively set to a count commensurate with $\pm\Phi_1$ in accordance with the position of radiation source 272 prior to the radiation source coming into the detector field of view between lines 251 and 252. If radiation source 272 is initially outside the defining field of view between lines 251 and 252, at an angle above the horizon greater than $\Phi_1$, counter 271 is set to the $+\Phi_1$ state. With counter 271 set to the $+\Phi_1$ state, it is activated so that the count stored therein is decremented in response to each transition in the output voltage amplifier 269. In an opposite manner, if radiation source 272 is outside of the field of view because it is at a vertical angle greater than $-\Phi_1$, counter 271 is set to a count of $-\Phi_1$ and is activated so that its count is incremented, rather than decremented, in response to each transition from the output of amplifier 269.

To these ends, the voltages applied to the positive and negative input terminals of differential amplifier 269 are summed together in amplifier 273. The output voltage of amplifier 273 is fed to trigger circuit 274. The triggering level of circuit 274 is adjusted whereby the trigger derives a positive voltage in response to the output of amplifier 273 being greater than a predetermined level that indicates each of radiation detectors 231—238 is illuminated by radiation from source 272. The output of trigger circuit 274 is applied to input 275 of counter 271, which input, when activated with a positive voltage, sets the counter to a state corresponding with $+\Phi_1$. In response to the positive output voltage of trigger 274, input 275 energizes counter 271 so it is decremented in response to each transition in the output voltage of amplifier 269. Counter 271 is set to its second initial condition, whereby a value of $-\Phi_1$ is preloaded therein and it is energized so its count is incremented in response to each transition in the output voltage of amplifier 269, by NAND gate 276 feeding a positive voltage to the counter input terminal 277. NAND gate 276 is fed by the outputs of threshold detector 261 and amplifier 269, to derive a positive output voltage only when its two input signals are of zero voltage value.

The count stored in counter 271 is applied to readout means 278, which includes the necessary conversion to enable a decimal display to be derived.

To provide a better and more complete understanding as to the manner in which the system of FIG. 20 functions, a number of examples will be given, first presuming that radiation source 272 moves downwardly from a position above the angle $\Phi_1$. With radiation source 272 initially above line 252, i.e., at an angle greater than $\Phi_1$, each of detectors 231—238 is irradiated. In response to irradiation from each of detectors 231—238, each of threshold detectors 261—268 generates a positive output voltage of predetermined magnitude. The positive output voltages generated by each of detectors 261—268 are applied to the input terminals of summing amplifier 273, which drives trigger circuit 274 to a positive output voltage.

The positive output voltage of trigger circuit 274 is coupled to input terminal 275 of counter 271, setting the counter to a count commensurate with the angle $\Phi_1$. The positive voltage applied to terminal 275 also causes counter 271 to be set so that it is decremented in response to each subsequent transition in the bilevel output of amplifier 269. The positive output voltage of trigger 274 maintains counter 271 activated as stated until radiation source 272 passes to an angle where shield 241 prevents irradiation by detector 238 from source 274.

In response the detector 238 being shadowed from source 272 by shield 241 when source 272 moves to the sector between lines 281 and 282, threshold detector 268 is switched from a positive to a zero output voltage. In response to the output voltage of threshold detector 268 dropping to a zero voltage, the output voltage of amplifier 273 becomes less than the threshold value of trigger circuit 274, whereby the trigger circuit output voltage goes to zero, enabling the count in counter 271 to be changed in response to transitions in the output voltage of amplifier 269. Counter 271 includes memory means so that it remains activated in the decrement mode, whereby each transition in the amplifier 269 output causes the count stored in the counter to be reduced by one.

Simultaneously with the output voltage of trigger 274 being reduced to the zero voltage level, a difference in the voltages applied to the positive and negative input terminals of amplifier 269 occurs. The difference in the voltages applied to the input terminals of amplifiers 269 occurs in response to each of threshold detectors 261—264 deriving a positive voltage, while only threshold detectors 265—267 feed positive voltages to the negative input terminal of the amplifier.

In response to the difference voltage at the input terminals of amplifier 269, the amplifier derives a finite positive amplitude output signal. The output signal derived from amplifier 269 is delayed slightly with respect to the transition in the output of trigger circuit 274, whereby counter 271 is positively driven by the positive-going transition in the output voltage of amplifier 269 after the trigger output level has dropped to zero. In response to the positive-going transition in the output voltage of amplifier 269, the state of counter 271 is decremented by a count of one and an indication is derived from readout means 278 that radiation source 272 is in the field defined by lines 281 and 282.

As radiation source 272 continues downwardly it crosses line 282, whereby radiation detector 234 is no longer irradiated. In response to cessation of irradiation of detector 234 by source 272, the output voltage of threshold detector 264 drops to the zero voltage level and a negative going transition occurs in the output voltage of amplifier 269. The negative going transition in the output voltage of amplifier 269 activates counter 271 so that the count stored therein is decremented again, whereby readout 278 provides an indication that radiation source 272 is in the field of view between lines 282 and 283. In the manner described, it is believed obvious as to the manner in which counter 271 responds to radiation from source 272 and reeds readout means 278 to provide an indication of the angular position of the radiation source.

Once radiation source 272 descends vertically to an angle less than −Φ, i.e., is below line 251, no radiation impinging on detectors 231—238. In response to zero radiation impinging on each of detectors 231—238, each of threshold detectors 261—268 derives a zero voltage output level. The zero voltage output levels of threshold detectors 261—268 feed the positive and negative input terminals of amplifier 269, whereby the amplifier derives a zero output voltage. The zero voltage output level of amplifier 269 is fed to NAND gate 276 that is also responsive to the zero voltage output of threshold detector 261. Since both inputs to NAND gate 276 are zero voltages, the NAND gate generates a positive output voltage, setting counter 271 to a −Φ$_1$ state and energizing the counter so that it is incremented in response to subsequent transitions in the output voltage of amplifier 269.

If radiation source 272 should now return into the field of view of detectors 231—238 by crossing line 251 in the upward direction, radiation detector 231 is illuminated. In response to irradiation of detector 231 by source 272, threshold detector 261 derives a positive output voltage, whereby a positive transition is derived at the output terminal of amplifier 269 and the input voltage of counter 271, at terminal 277, drops to a zero level. In response to the positive transition at the output terminal of amplifier 269, counter 271 is incremented by a count of one, to derive an indication that source 272 is between the angle defined by lines 251 and 284. In the manner described, counter 271 responds to succeeding illumination of the detectors in channel 223, whereby readout means 278 provides a decimal indication of the angular position of source 272 as it traverses upwardly.

Figure 21:
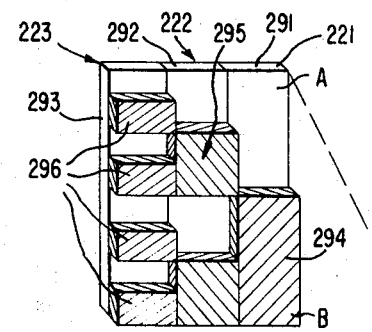
FIG. 21 is a perspective view of a modification of the system illustrated by FIGS. 17 and 18.

Reference is now made to FIG. 21 of the drawings, wherein there is illustrated a further embodiment of the invention. The embodiment of FIG. 21 is very similar to that of FIG. 17 in that it includes shadow mask 241 and does not require a detector channel for acquisition purposes solely. The system of FIG. 21 differs from the detector array of FIG. 17, however, since only one detector per channel is required.

In particular, each of channels 221, 222 and 223 includes a single detector 291, 292 and 293, respectively. Positioned between the detector array and shadow mask 241 is a separate shield array 294—296 for each of detectors 291—293, respectively. Shield arrays 294—296 are arranged precisely in the same manner as shield arrays 204—206, FIG. 15, to define equal radiation fields of view for each of the detector channels and a different number of effective detector areas in each channel.

The system of FIG. 21 does not require an acquisition detector, such as detector 200, FIG. 15, because the upper surface of shadow mask 241 is positioned so that radiation must fall on the upper surfaces of each of detectors 291, 292 and 293. Hence, if the radiation source is anywhere in the field of view, at least one of the detectors 291—293 is illuminated. It is thus seen that the system of FIG. 21 incorporates the advantages of the system of FIG. 18 relating to lack of collimating requirements, but avoids the complexities of the multidetector array thereof.

Figure 22:
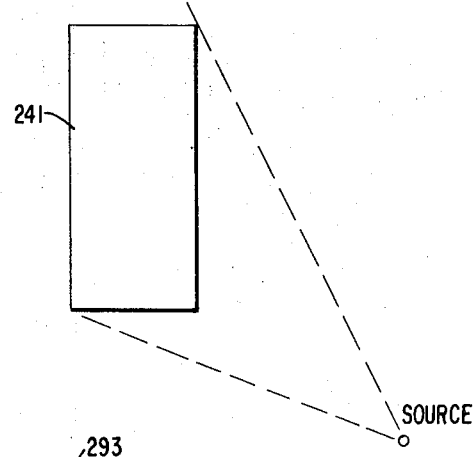
FIG. 22 is a circuit diagram of the readout apparatus utilized in conjunction with the system of FIG. 21.

Reference is now made to the circuit diagram of FIG. 22, particularly designed to provide a decimal readout for the positional data derived from the detector array of FIG. 21. In the circuit of FIG. 22, detectors 291—293 feed threshold detectors 301—303, respectively. Threshold detector 301 is substantially the same as the threshold detector illustrated by FIG. 9, except the range computer is excluded.

Threshold detectors 302 and 303 in the circuit of FIG. 22, however, are materially different from the threshold detector 301. Detectors 302 and 303 derive a bilevel transition in response to each step function change in the radiation level impinging on detectors 292 and 293, respectively. Since each of threshold detectors 302 and 303 is identical, a description of detector 302 suffices.

Threshold detector 302 includes integrators 304 and 305, driven in parallel by the output of radiation detector 292. Integrator 304 includes a relatively long time constant charging circuit and a short time constant discharge circuit while the converse is true of integrator 305, i.e., integrator 305 has a short time constant charging circuit and a long time constant discharge circuit. Thereby, in response to a step function increase in the count rate derived by detector 292, the output voltage of integrator 304 does not change suddenly, but the output voltage of integrator 305 increases at a relatively rapid rate. In contrast, a sudden decrease in the count rate derived from radiation detector 292 results in a sudden decrease in the output voltage of integrator 304 and a slow transition in the voltage generated by integrator 305.

The output voltages of integrators 304 and 305 are applied to differentiators 306 and 307, respectively. Differentiators 306 and 307 are connected so that sudden transitions in the output voltages of integrators 304 and 305 in response to step function variations in the radiations level impinging on detector 292 cause relatively large voltage outputs to be generated by the differentiators.

The outputs of differentiators 306 and 307 are linearly combined in summing network 308, the output of which feeds flip-flop 309. Flip-flop 309 responds to each pulse fed thereto by summing network 308, whereby the flip-flop state is changed in response to each output pulse from summing network 308. It is thereby seen that the output voltage of flip-flop 309 is a bilevel wave train having transitions corresponding with transitions in the radiation level impinging on radiation detector 292.

The bilevel outputs of detectors 301—303 are applied as parallel binary inputs to binary to decimal converter and readout means 311. Thereby, a visual decimal indication is provided of the angular position of a radiation source illuminating or irradiating the detector array of FIG. 21.

While I have described and illustrated several specific embodiments of my invention, it will be clear that variations of details of construction which are specifically illustrated and described may be made without departing from the true spirit and scope of the invention as defined in the appended claims. For example, the spacing of adjacent gaps in the various shield members need not be uniform but can be nonlinear, for example, to derive direct indications of the sine of an angle, or if greater resolution is required in certain angular regions than in others. It is also to be understood that digital, rather than analogue techniques can be utilized for deriving signals indicative of the count rate picked up by each detector. In accordance with a further modification, all of the detectors in the embodiment of FIGS. 3—8 need not be in stacked relationship, but they can be divided in several stacks, each having substantially the same field of view.

The count rates are illustrated by way of example only and values other than that described may be found depending on the specific source strengths, detector construction and electronic data-handling equipment employed.

I claim:

1. A system for indicating the angular position of a source of penetrating radiation, comprising a plurality of detector channels for radiation from said source, each of said channels covering substantially the same field of view relative to said source and having differing numbers of detector areas susceptible to exposure to radiation from said source, means for selectively blocking the passage of said radiation to the detector areas of said channels as a function of the source angular position, and means for deriving a signal from each of said channels indicative of the amount of said radiation received by the exposed detector areas of each respective channel, said means for deriving, including means for generating a bilevel signal in response to the total number of counts of said radiation impinging on each of said channels within a predetermined time interval, the number of counts per said predetermined time interval to derive an indication of a source being in the field of view for each channel being related to the number of channels so that the amount of information derived from all of the channels increases exponentially as the number of channels increases.

2. The system of claim 1 wherein $Q$ of said channels are provided, the $N$th one of said channels including $M \times 2^{N-1}$ exposed areas, where $M$ is a positive integer equal to or greater than one, $Q$ is a positive integer greater than one, and $N$ is selectively all integers from one to $Q$, inclusive.

3. The system of claim 1 wherein adjacent ones of said detector areas in each channel are separated from each other by areas unresponsive to radiation from said source.

4. The system of claim 3 wherein said areas unresponsive to said radiation are detector areas covered by shields for said radiation, said shields comprising said blocking means, said exposed areas and the surfaces of said shields being arcuate in cross section, the arcuate surfaces of said shields in each channel having greater radii than the exposed detector areas.

5. The system of claim 4 further including radially extending collimator plates between adjacent shields in one of said channels.

6. The system of claim 5 wherein said exposed detector areas and arcuate shields are cylindrical.

7. The system of claim 5 wherein said detector areas and arcuate shields are defined as figures of revolution.

8. The system of claim 1 further including an additional detector channel having the same field of view as each of said plurality of detector channels, said additional detector channel being always exposed to radiation from said source anywhere in said field of view.

9. The system of claim 1 wherein said blocking means comprises shield means for said radiation positioned between said source and detector areas, said shield means including slit means for passing relatively narrow width beams of said radiation to each of said channels.

10. The system of claim 1 wherein said blocking means includes shield means for said radiation positioned between said source and detector areas of said channels, said shield means having an edge positioned to define a demarcation line for irradiated and nonirradiated detector areas of said channels determined by the position of said source, all of the detector areas of said channels on one side of said line being irradiated by said source and all of the detector areas of said channels on the other side of said line being shadowed from said source by said shield means.

11. The system of claim 10 wherein adjacent ones of said detector areas in each channel are separated from each other by areas unresponsive to radiation from said source, said detector areas on said one side having an exposed detector area in each channel always exposed to radiation from said source when the source is in said field of view.

12. The system of claim 1 wherein the detector areas of each channel are substantially coplanar and aligned, each of said channels having generally parallel longitudinal axes.

13. The system of claim 1 wherein each of said channels includes two groups of detector areas, each detector of each group being adjacent to a detector of the other group, each detector of each group being separated from another detector of that group by a detector of the other group.

14. The system of claim 13 wherein said means for deriving for each channel includes means for comparing the amount of said radiation impinging on the first and second detector groups of each channel.

15. The system of claim 14 wherein said means for comparing includes means for deriving only a bilevel signal in response to the amount of said radiation impinging on each of the exposed areas, and means for linearly combining each of the bilevel signals derived from the exposed areas of each channel.

16. The system of claim 15 wherein said means for deriving includes means for deriving first and second bilevel signals from each of the exposed areas of said first and second groups, said combining means including means for linearly combining said first signal and means for linearly combining said second signals. 47

17. A detector for indicating the angular position of a source of penetrating radiation comprising a plurality of detector channels for radiation from said source, each of said channels covering substantially the same field of view relative to said source and having differing numbers of detector areas susceptible to exposure to radiation from said source, and means for selectively blocking the passage of said radiation to the detector areas of said channels as a function of the source angular position wherein said blocking means includes shield means for said radiation positioned between said source and detector areas, said shield means having an edge positioned to define a demarcation line for irradiated and nonirradiated exposed detector areas determined by the position of said source, all of the exposed areas on one side of said line being irradiated by said source and all of the exposed areas on the other side of said line being shielded from said source be said shield means.

18. The system of claim 17 wherein adjacent ones of said detector areas in each channel are separated from each other by areas unresponsive to radiation from said source, said detector areas on said one side having an exposed detector area in each channel always exposed to radiation from said source when the source is in said field of view.

19. The system of claim 17 wherein each of said channels includes two groups of detector areas, each detector of each group being adjacent to a detector of the other group, each detector of each group being separated from another detector of that group by a detector of the other group.

20. A detector for indicating the angular position of a source of penetrating radiation comprising a detector channel for said radiation having a predetermined field of view, a multiplicity of different, separate detector areas within said channel each of said areas being susceptible to exposure to said radiation to derive an output signal in response to said radiation impinging thereon, different ones of said areas being irradiated by said source for differing positions of said source relative to said channel, and shield means for said radiation positioned between said source and detector areas, said shield means having an edge positioned to define a demarcation line for irradiated and nonirradiated detector areas of said channel determined by the position of said source, all of the detector areas on one side of said line being irradiated by said source and all of the detector areas on the other side of said line being shielded from said source by said shield means.

21. The system of claim 20 wherein said multiplicity of detector areas are separated from each other by a plurality of second detector areas, means responsive to the amount of radiation impinging on each of said plurality of areas for deriving first and second bilevel signals indicative of the total radiation impinging on each area being greater than a set level within a predetermined time interval, and means for comparing the sum of the first-named bilevel signal with the sum of the second named bilevel signal.

22. The system of claim 20 wherein adjacent ones of said detector areas in said channel are separated from each other by areas unresponsive to radiation from said source, said detector areas on said one side having a detector area in said channel always exposed to radiation from said source when the source is in said field of view.